United States Patent [19]

Mitake

[11] Patent Number: 4,764,103
[45] Date of Patent: Aug. 16, 1988

[54] INJECTION MOLD

[75] Inventor: Hiroshi Mitake, Odawara, Japan

[73] Assignee: Fuji Photo Film Co., Ltd., Japan

[21] Appl. No.: 906,208

[22] Filed: Sep. 12, 1986

[30] Foreign Application Priority Data

Sep. 12, 1985 [JP] Japan .............................. 60-202146

[51] Int. Cl.[4] ............................................. B29C 45/43
[52] U.S. Cl. ..................................... 425/577; 249/58;
249/63; 249/66 A; 249/142; 425/547; 425/556
[58] Field of Search ............... 425/556, 577, 547, 574,
425/575; 264/328.11, 328.16, 328.7; 249/58, 64,
68, 98, 122, 142, 144, 63, 66 A, 66 C

[56] References Cited

U.S. PATENT DOCUMENTS

| | | | |
|---|---|---|---|
| 1,918,532 | 7/1933 | Geyer | 425/577 |
| 3,109,198 | 11/1963 | Guignard | 425/577 X |
| 3,534,443 | 10/1970 | Tucker | 425/577 X |
| 3,555,618 | 1/1971 | Cooper | 425/577 X |
| 3,754,846 | 8/1973 | Choate | 425/577 X |
| 4,125,246 | 11/1978 | von Holdt | 425/577 X |
| 4,364,895 | 12/1982 | Underwood | 425/556 X |
| 4,531,703 | 7/1985 | Underwood | 425/577 X |
| 4,552,328 | 11/1985 | Dutt et al. | 425/577 X |
| 4,632,357 | 12/1986 | von Holdt | 249/68 X |
| 4,632,657 | 12/1986 | Potoczky | 425/556 |
| 4,653,997 | 3/1987 | Sheffield et al. | 425/556 |

FOREIGN PATENT DOCUMENTS 2619064 11/1977 Fed. Rep. of Germany ...... 425/577

Primary Examiner—Richard L. Chiesa
Attorney, Agent, or Firm—Pasquale A. Razzano

[57] ABSTRACT

An injection mold for molding a tubular article having a closed end comprises a stationary mold half including a cavity plate having at least one cavity impression and a movable mold half which is movable between a closed position and an open position and is provided with at least one core portion for defining a cavity together with the cavity impression when the movable mold half is moved to the closed position. A recess is formed in the top face of the core portion and a telescopic mold piece is fitted into the recess in such a manner that a narrow space is formed therebetween. An air chamber having a relatively large volume is formed in the vicinity of the top face of the core portion. The air chamber is communicated with the space over the top face of the core portion by way of the narrow space between the mold piece and the recess, and with the atmosphere by way of a communicating passage formed in the core portion.

6 Claims, 3 Drawing Sheets

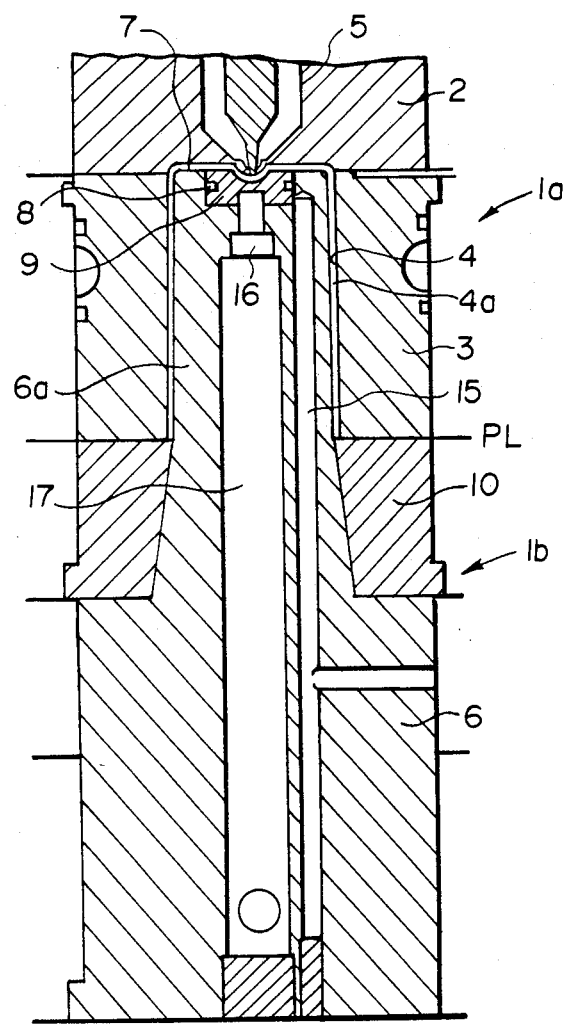

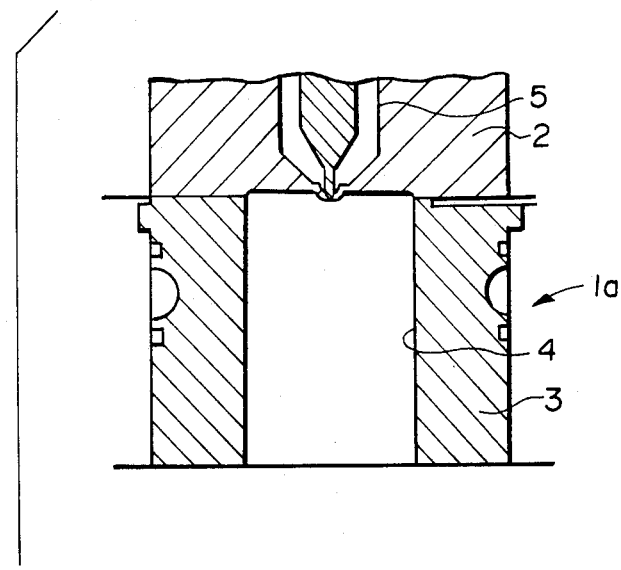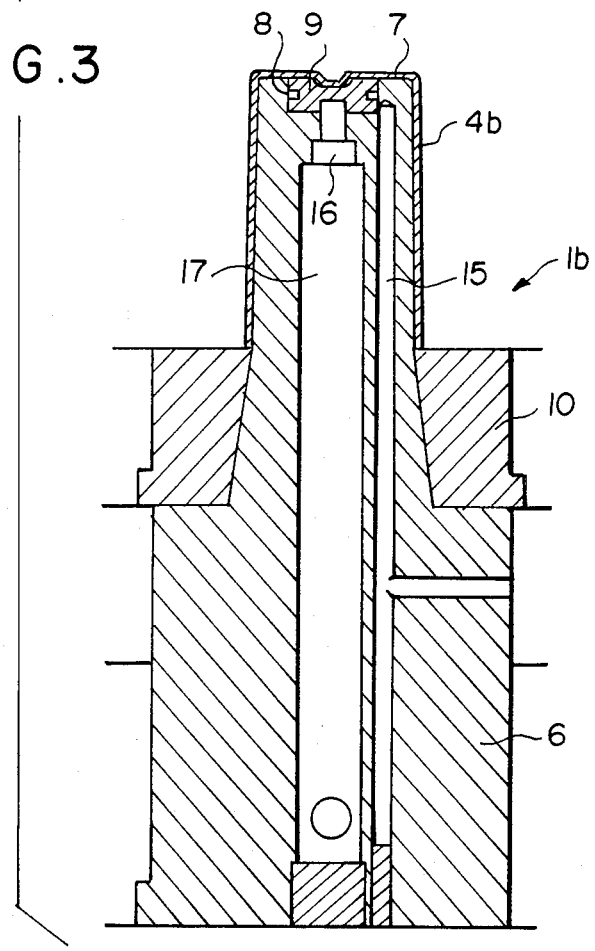
FIG.3

INJECTION MOLD

BACKGROUND OF THE INVENTION

1. Field of the Invention

This invention relates to an injection mold, and more particularly to an injection mold for molding a glass-like tubular article having a closed end.

2. Description of the Prior Art

In plastic injection molding of a glass-like tubular article with a closed end, there is encountered a problem that, when the tubular article is ejected from the core of the movable mold half, vacuum builds up between the top surface of the core and the closed end of the article as the article is moved away from the core. If the article is forced away from the core against the force of the vacuum, the article may suffer breakage or the inner surface of the article may be scratched on the core. Sometimes resin material is scraped off from the inner surface of the article in the form of resin particles and the resin particles adhere to the inner surface of the article under the influence of electrostatic attraction force, and the resin particles may subsequently mingle with material loaded in the article. In order to avoid this problem, air must be fed in between the inner surface of the article and the outer surface of the core when ejecting the article from the core.

There has been known an injection mold in which a telescopic mold piece is inserted into a recess which is formed on the top of the core and which has a diameter slightly larger than the telescopic mold piece so that a small space is formed between the outer peripheral edge of the mold piece and the inner peripheral edge of the recess, and the core is provided with a communicating passage for communicating the lower surface of the mold piece with the atmosphere. In the ejection air is introduced between the article and the core through the small space to prevent a vacuum from being built up. The width of the space must be very narrow so that molten resin injected into the cavity does not flow into the space and typically should be not larger than 2/100 mm. Further, since it is very difficult to insert the telescopic mold piece into the recess on the top of the core precisely coaxially therewith, the mold piece and the recess are generally sized so that the width of the space does not exceed 2/100 mm at any position of the mold piece relative to the recess, and accordingly the width of the space is normally substantially smaller than 2/100 mm. The narrow width of the space increases, the flow resistance of the air and, though depending on the ejecting speed, sufficient air cannot be fed in between the article and the core to prevent a vacuum from being built up therebetween during ejection.

The difficulties in the known injection mold may be overcome by feeding air through the space between the mold piece and the recess under pressure. However, this approach is disadvantageous in that in the case of a multicavity mold it is very difficult to control the air pressure to be fed to each core. That is, if one of the cores is fed with air at an excessively high pressure, the article carried on the core can be thrown away from the core into the corresponding cavity in the stationary mold half, and if the mold is subsequently closed with the article remaining in the cavity, the mold can be damaged.

SUMMARY OF THE INVENTION

In view of the foregoing observations and description, the primary object of the present invention is to provide an injection mold for molding a tubular article with a closed end in which sufficient amount of air can be fed in between the core and the inner surface of the article during ejection of the article from the movable mold half without feeding in the air under pressure.

In accordance with the present invention, there is provided an injection mold for molding a tubular article having a closed end comprising a stationary mold half including a cavity plate having at least one cavity impression and a movable mold half which is movable between a closed position and an open position and is provided with at least one core portion for defining a cavity together with the cavity impression when the movable mold half is moved to the closed position. A recess is formed in the top face of the core portion and a telescopic mold piece is fitted into the recess in such a manner that a narrow space is formed therebetween. An air chamber having a relatively large volume is formed in the vicinity of the top face of the core portion. The air chamber is communicated with the space over the top face of the core portion by way of the narrow space between the mold piece and the recess, and with the atmosphere by way of a communicating passage formed in the core portion.

The air chamber may be formed in either the core portion or the telescopic mold piece, or may be formed partly in the core portion and partly in the telescopic mold piece.

BRIEF DESCRIPTION OF THE DRAWINGS

FIG. 1 is a fragmentary cross-sectional view of an injection mold in accordance with an embodiment of the present invention, FIG. 2a is a fragmentary cross-sectional view showing in detail a part of the injection mold, FIG. 2b is a plan view of the part shown in FIG. 2a, FIGS. 3 and 4 are cross-sectional views for illustrating the operation of the injection mold of this embodiment.

DESCRIPTION OF THE PREFERRED EMBODIMENT

Figure 4:
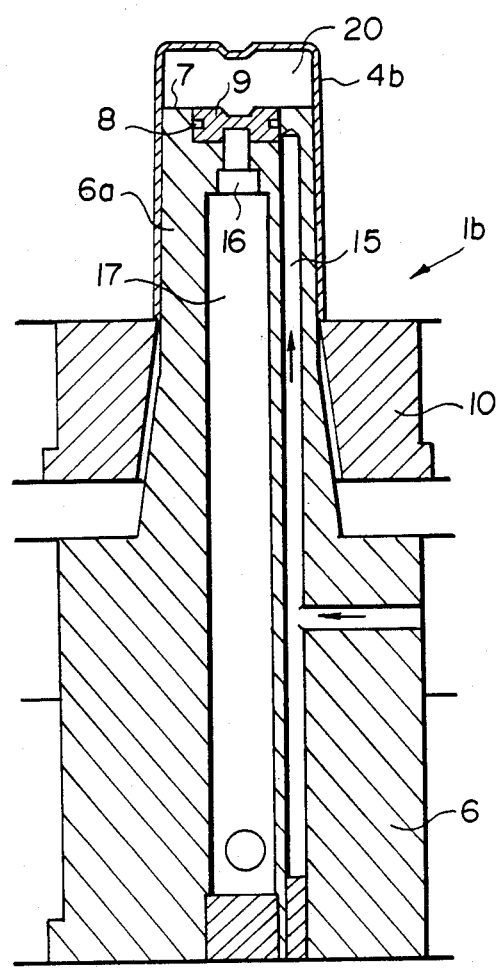

In FIG. 1, an injection mold in accordance with an embodiment of the present invention comprises a stationary mold half 1a and a movable mold half 1b. The mold halves 1a and 1b are shown in the closed state in FIG. 1, and can be opened from line PL. The stationary mold half 1a includes a cavity plate 3 fixed to a back plate 2. In the cavity plate 3 is formed a cavity impression 4 which defines a cavity 4a together with a core bushing 6 when the mold is closed. A hot runner 5 extends through the back plate 2 and is communicated with the cavity impression 4 by way of a gate so that molten resin can be injected into the cavity 4a. The cavity 4a is shaped to mold a glass-like tubular article. The movable mold half 1b includes the core bushing 6 and a stripper plate 10. The core bushing 6 includes a core portion 6a projecting through the stripper plate 10 toward the stationary mold half 1a to be inserted into the cavity impression 4 to define the cavity 4a when the mold is closed. The stripper plate 10 is movable back and forth along the core portion 6a. The stripper plate 10 is moved toward the top of the core portion 6a by a hydraulic ejector pin (not shown) to eject the article carried on the core portion 6a and is moved toward the base of the core portion 6a to the position shown in FIG. 1 pushed by the cavity plate 3 when the mold is closed. The stripper plate 10 may be spring-urged toward the position shown in FIG. 1.

As clearly shown in FIGS. 2a and 2b, a recess 8 is formed in the top face 7 of the core portion 6a and a telescopic mold piece 9 is fitted into the recess 8. The mold piece 9 is fixed in the recess 8 by a bolt 16 inserted from the bottom of a cooling water passage 17 (FIG. 1). The mold piece 9 has a head portion 11 and a shank portion. The diameter of the head portion 11 is larger than that of the shank portion and is selected so that the head portion 11 is snugly fitted into the recess 8. Accordingly, an annular space or chamber 14 is formed between the inner surface of the recess 8 and the shank portion of the mold piece 9. The annular space 14 is communicated with the atmosphere by way of a communicating hole 15 formed through the core bushing 6. Four cutaway portions 12 are formed on the side surface of the head portion 11, and thereby four spaces 13 are formed between the head portion 11 and the inner surface of the recess 8 to communicate the chamber 14 with the space above the top face 7 of the core portion 6a. The dimensions of the cutaway portions 12 are selected to give the space 13 a maximum width within a limit in which molten resin cannot flow into the space. Generally the width of the space should be not larger than 2/100 mm. The lower surface of the shank portion of the mold piece is provided with an annular groove 18 and an O-ring 19 is seated in the groove 18 to prevent cooling water in the cooling water passage 17 from entering the chamber 14.

After molten resin is injected into the cavity 4a and is cooled, the movable mold half 1b is moved away from the stationary mold half 1a, that is, the injection mold is opened, as shown in FIG. 3. Thereafter, the stripper plate 10 is moved toward the top of the core portion 6a to push the article 4b carried on the core portion 6a away from the core portion 6a. As the article 4b is moved away from the core portion 6a, a vacant space 20 is moved between the article 4b and the core portion 6a and the volume of the vacant space 20 is gradually increased. If air is not fed in between the article 4b and the core portion 6a while the article 4b is pushed away from the core portion 6a, there will be a vacuum built up in the vacant space 20 which gives rise to various problems as described above. In the mold of this embodiment, air is fed to the vacant space 20 through the spaces 13, the annular chamber 14 and the communicating hole 15 to prevent a vacuum from being built up in the space 20, and since the chamber 14 has a relatively large volume, a sufficient amount of air can be fed to the space 20 in response to an increase in the volume of the space 20.

Figure 5:
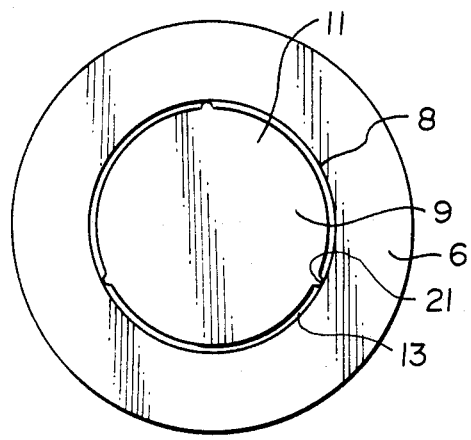
FIGS. 5 and 6 are views similar to FIG. 2b but for illustrating different embodiments of the present invention.
Figure 6:
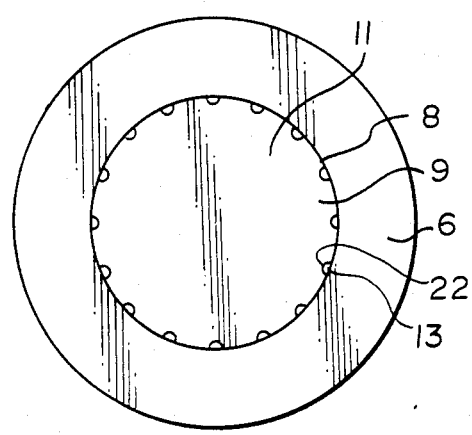

Though four spaces 13 are formed in the embodiment described above, the number of the spaces need not be limited to four. Further, though in the embodiment described above, the space for communicating the chamber 14 with the top face 7 of the core portion 6a is formed by chamfering the side surface of the head portion 11, the space may be formed by providing a plurality of protrusions 21 on the side surface of the head portion 11 as shown in FIG. 5 or by providing a plurality of recesses 22 on the side surface of the head portion 11 as shown in FIG. 6.

I claim:

1. An injection mold with means for injecting molten resin for molding a tubular article having a closed end comprising a stationary mold half including a cavity plate having at least one cavity impression and a movable mold half which is movable toward and away from the stationary mold half between a closed position and an open position and is provided with at least one core portion for defining a cavity together with the cavity impression when the movable mold half is moved to the closed position, characterized in that a recess is formed in the top face of the core portion, a telescopic mold piece is fitted into the recess in such a manner that a narrow space is formed and is always present therebetween, and an air chamber having a relatively large volume permanently positioned in the vicinity of the top face of the core portion so that said narrow space is relatively short, the air chamber being communicated with the portion of the cavity over the top face of the core portion by way of said narrow space between the mold piece and the recess, and with the atmosphere by way of a communicating passage formed in the core portion, said narrow space between the recess and the mold piece having such a width that substantially no molten resin can enter said narrow space.

2. An injection mold as defined in claim 1 in which said telescopic mold piece comprises a head portion and a shank portion having a diameter smaller than that of the head portion, and the head portion has a diameter substantially equal to the diameter of said recess on the core portion so that the head portion snugly fits into the recess, said narrow space between the side surface of the head portion and the inner surface of the recess and said air chamber being an annular chamber formed between the shank portion and the inner surface of the recess.

3. An injection mold as defined in claim 2 in which said space is formed by chamfering a part of the side surface of the head portion.

4. An injection mold as defined in claim 2 in which said space is formed by providing a plurality of protrusions on the side surface of the head portion to extend in the axial direction thereof.

5. An injection mold as defined in claim 2 in which said space is formed by providing a plurality of recesses on the side surface of the head portion to extend in the axial direction thereof.

6. An injection mold with means for injecting molten resin for molding a tubular article having a closed end comprising a stationary mold half including a cavity plate having at least one cavity impression and a movable mold half which is movable toward and away from the stationary mold half between a closed position and an open position and is provided with at least one core portion for defining a cavity together with the cavity impression when the movable mold half is moved to the closed position, characterized in that said core portion has a top face, said top face having a recess formed therein, and wherein a telescopic mold piece having a topmost surface is fitted into the recess in such a manner that a narrow space is formed therebetween and so that the top face of the mold piece is coextensive with the top face of the core portion, and an air chamber having a relatively large volume permanently positioned in the vicinity of the top face of the core portion so that said narrow space is relatively short, the air chamber being communicated with the portion of the cavity over the top face of the core portion by way of said narrow space between the mold piece and the recess, and with the atmosphere by way of a communicating passage formed in the core portion, said narrow space between the recess and the mold piece having such a width that substantially no molten resin can enter said narrow space, and wherein said telescopic mold piece comprises a head portion and a shank portion having a diameter smaller than that of the head portion, and the head portion has a diameter substantially equal to the diameter of said recess on the core potion so that the head portion snugly fits into the rrecess, said narrow space between the side surface of the head portion and the inner surface of the recess and said air chamber being an annular chamber formed between the shank portion and the inner surface of the recess.

* * * * *